(12) United States Patent
Solinger et al.

(10) Patent No.: US 12,045,883 B2
(45) Date of Patent: *Jul. 23, 2024

(54) COMPUTER SYSTEM AND A COMPUTERIZED METHOD FOR CENTRAL COUNTERPARTY LIMIT MANAGEMENT

(71) Applicant: NEX Services North America LLC, New York, NY (US)

(72) Inventors: Nicholas J. Solinger, Edina, MN (US); Yuval Kost, Tel-Aviv (IL)

(73) Assignee: NEX Services North America LLC, New York, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/886,082

(22) Filed: Aug. 11, 2022

(65) Prior Publication Data
US 2022/0383415 A1    Dec. 1, 2022

Related U.S. Application Data

(63) Continuation of application No. 16/561,173, filed on Sep. 5, 2019, now Pat. No. 11,449,937, which is a
(Continued)

(51) Int. Cl.
*G06Q 40/04* (2012.01)
(52) U.S. Cl.
CPC .................. *G06Q 40/04* (2013.01)
(58) Field of Classification Search
CPC .............................. G06Q 40/02–04
See application file for complete search history.

(56) References Cited

U.S. PATENT DOCUMENTS 7,685,044 B1 *   3/2010  Robertson .............. G06Q 40/06
                                              705/37
10,453,133 B1 * 10/2019  Solinger ................ G06Q 40/04
(Continued)

OTHER PUBLICATIONS

"First FCM Completes Production Testing with CreditLink for Pre-Trade Clearing Certainty", Traiana, May 15, 2013.
(Continued)

*Primary Examiner* — Eric T Wong
(74) *Attorney, Agent, or Firm* — Lempia Summerfield Katz LLC

(57) ABSTRACT

A computer system 10 for central counterparty limit management, the computer system 10 comprising one or more computers on a network. The computer system 10 comprises an input to receive an indication of a planned order of at least one over-the-counter derivative between counterparties from an asset manager 14. The planned order is associated with at least one actual order to be executed on an execution venue 16. The computer system 10 also includes at least one storage device configured to store a limit comprising an indication of counterparty risk as a stored limit of the asset manager 14; an execution venue output configured to output an indication of a counterparty risk limit of the asset manager 14 to an execution venue 16; and an asset manager output configured to output an indication that the planned order is within the stored limit of the asset manager to the asset manager 14. The computer system 10 is configured such that in response to receiving the indication of a planned order at the input from the asset manager 14, computer system 10 checks if the planned order is within the stored limit of the asset manager 14, and, if the planned order is within the stored limited of the asset manager 14, the computer system 10 outputs from the execution venue output an indication of a limit corresponding to the limit
(Continued)

required to execute the actual order associated with the planned order on an execution venue 16 to the execution venue.

23 Claims, 2 Drawing Sheets

Related U.S. Application Data continuation of application No. 14/513,487, filed on Oct. 14, 2014, now Pat. No. 10,453,133.

(60) Provisional application No. 61/928,598, filed on Jan. 17, 2014, provisional application No. 61/889,730, filed on Oct. 11, 2013.

(56) References Cited

U.S. PATENT DOCUMENTS

| | | | |
|---|---|---|---|
| 11,449,937 B1* | 9/2022 | Solinger | G06Q 40/04 |
| 2002/0032635 A1* | 3/2002 | Harris | G06Q 20/10 |
| | | | 705/37 |
| 2002/0133455 A1 | 9/2002 | Howorka | |
| 2002/0178102 A1 | 11/2002 | Scheinberg | |
| 2003/0225681 A1 | 12/2003 | Cummings | |
| 2007/0118459 A1 | 5/2007 | Bauerschmidt | |
| 2009/0271325 A1* | 10/2009 | Wilson | G06Q 40/06 |
| | | | 705/36 R |
| 2010/0094743 A1* | 4/2010 | Robertson | G06Q 40/06 |
| | | | 705/37 |
| 2011/0166982 A1* | 7/2011 | Cole | G06Q 40/06 |
| | | | 705/37 |
| 2011/0225081 A1* | 9/2011 | Kittelsen | G06Q 40/04 |
| | | | 705/37 |
| 2012/0254012 A1 | 10/2012 | Studnitzer | |
| 2012/0284158 A1* | 11/2012 | Kovac | G06Q 40/06 |
| | | | 705/37 |
| 2013/0179320 A1 | 7/2013 | May | |
| 2013/0254089 A1* | 9/2013 | Kirby | G06Q 40/06 |
| | | | 705/37 |
| 2015/0032591 A1 | 1/2015 | Jacob | |

OTHER PUBLICATIONS

"Traiana CreditLink for Swaps Trade Certainty Gains Momentum", Traiana, Jul. 17, 2013.
Lynn Strongin Dodds, "Clearing Certainty: Push, Ping or Hub Model?", Jun. 26, 2012.
Rhode, Will, Real-Time Clearing: The New Race to Zero, Jan. 2013. (Year: 2013).
Tradeweb, Certainty of execution and clearing, Creating a credit-checking tool for OTC derivatives, Jan. 2012. (Year: 2012).

* cited by examiner

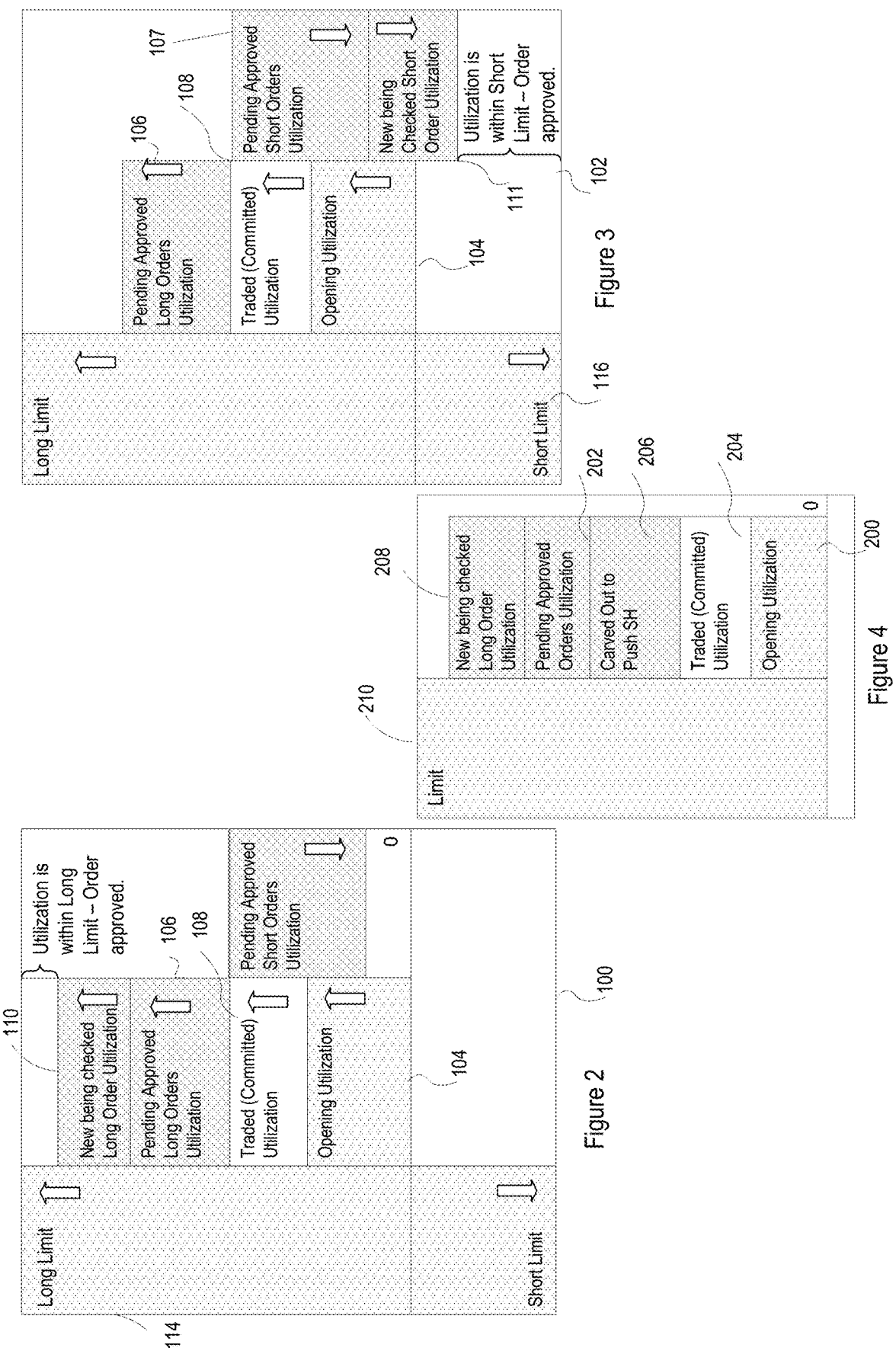

COMPUTER SYSTEM AND A COMPUTERIZED METHOD FOR CENTRAL COUNTERPARTY LIMIT MANAGEMENT

CROSS REFERENCE TO RELATED APPLICATIONS

This application is a continuation under 37 C.F.R. 1.53(b) of U.S. patent application Ser. No. 16/561,173 filed Sep. 5, 2019, now U.S. Pat. No. 11,449,937, which is a continuation under 37 C.F.R. 1.53(b) of U.S. patent application Ser. No. 14/513,487 filed Oct. 14, 2014, now U.S. Pat. No. 10,453,133, which claims the benefit of the filing date under 35 U.S.C. § 119(e) of U.S. Provisional Application Ser. No. 61/928,598, filed Jan. 17, 2014 and U.S. Provisional Application Ser. No. 61/889,730, filed Oct. 11, 2013 all of which are hereby incorporated by reference in their entirety and relied upon.

FIELD

The present invention relates to a computer system and a computerized method for central counterparty limit management. Embodiments of the computer system and computerized method manage limits, particularly for over the counter (OTC) derivatives trades.

BACKGROUND

Huge volumes of trading of financial instruments is carried out by computerized trading systems, so called electronic trading systems, every day. Trading on these systems occurs at very high speeds from traders located around the globe, particularly in the financial centers of London, New York, and Tokyo. Traders trading on electronic trading systems require technically reliable and fast trading platforms.

Derivatives are financial instruments whose value is based on the value of an underlying entity such as an asset, index, or interest rate. They are often traded OTC. An OTC contract is a bilateral contract in which two parties agree on how a particular trade or agreement is to be settled in the future. OTC trades are private trades that do not go through an exchange.

The OTC derivatives market is huge and has expanded massively over the last 20 years or so. The expansion has been driven by interest rate products, foreign exchange instruments and credit default swaps. The notional outstanding derivatives market has been reported as totaling approximately US $601 trillion at 31 Dec. 2010. In OTC markets, dealers act as market makers by quoting prices at which they will sell (ask or offer) or buy (bid) to other dealers. Dealers or asset managers may operate on an electronic brokering platform that allows dealers to submit quotes directly to and execute trades directly through an electronic or computerized system. These arrangements may treat dealers differently depending on, for example, their credit rating. Historically, clearing and settlement of trades have been left to the buyer and seller to arrange; it is bilateral. This is in contrast to exchange-based transactions, where trades are matched and guaranteed by the exchange.

Major regulatory reform initiatives in the United States such as the Dodd-Frank Wall Street Reform and Consumer Protection Act are addressing issues in OTC markets and, as a result, the post-trade clearing of OTC trades is being moved increasingly into clearing houses (also known as central counterparty clearing).

Clearing involves all activities from a commitment being made for a transaction (such as to buy or sell an asset) until it is settled (where the asset is delivered in return for a payment of money).

Clearing is necessary because the speed of trades is much faster than the time for completing the underlying transaction. It involves the management of post-trade, pre-settlement credit exposures to ensure that trades are settled in accordance with market rules. Clearing processes include reporting and monitoring, risk margining, netting of trades to single positions, tax handling, and failure handling. OTC derivative trades can lead to significant counterparty risk, which is the risk that a counterparty in a derivatives transaction will default prior to expiration of the trade and will not make the current and future payments required by the contract.

Futures Commission Merchants (FCMs) provide clearing services. Thus, an FCM is an individual or organization which solicits or accepts orders to buy or sell, for example, futures contracts, options on futures, retail off-exchange foreign exchange contracts or swaps; and accepts money or other assets from customers to support such orders.

As mentioned above, regulators have mandated so-called central clearing of standardized over the counter (OTC) derivatives. Central clearing or central counterparty clearing is a process by which financial transactions are cleared by a single, that is to say "central", counterparty. This institution, therefore, takes all settlement risk.

The asset managers that buy and sell in the OTC derivatives market use FCMs for clearing their derivatives trades. A Swap Execution Facility (SEF) is a marketplace, platform, or execution venue on which cleared OTC trades have to be executed as required in the United States by the Dodd-Frank Wall Street Reform and Consumer Protection Act.

The Commodity Futures Trading Commission (CFTC) regulations 1.72, 1.73 and 1.74 require FCMs and Asset Managers to adapt a particular mode of trading mechanics. Rule 1.72 requires that asset managers shall have impartial access to execution venues (e.g. SEFs), and not be limited by its FCM so that an asset manager can execute a trade at the best terms available. Rule 1.73 requires FCMs to establish risk-based limits on asset managers accounts and screen orders for compliance with risk-based limits.

For an FCM to be compliant with the CFTC regulations and screen orders posted at an SEF, it has been considered that limits must be pushed to an SEF for each asset manager from its chosen FCM. It has been considered that, for pushing limits to SEFs, an asset manager needs to break up its limit, granted by its FCM, and post it out to SEFs. As a result, the SEF knows how much business an asset manager can transact without needing to check with anyone else. This arrangement makes clearing acceptance fast but means that asset managers have lower overall limits and less flexibility.

BRIEF SUMMARY OF THE INVENTION

Examples of the invention described herein mitigate the problem set out above. In the computerized method and computer system described herein, limits are kept in a single pool eliminating the need for breaking them up to individual execution venues, such as SEFs, market makers, regulated markets, multilateral trading facilities or other liquidity providers. Limits are pushed to an execution venue just in time for an asset manager to place an order at the execution venue. A total limit for an asset manager or the party for which they are acting is held or stored at an FCM. This limit is carved up, but only in response to a proposed or planned order. A limit is pushed on demand. This provides great flexibility for the asset manager as to where to consume the limits granted by FCMs. Significantly, the computer system of embodiments of the present invention are technically configured to provide for limits to be pushed just in time for an asset manager to place an order at the execution venue. The arrangement described herein is particularly applicable to execution venues in the form of SEFs.

The invention in its various aspects is defined in the independent claims below to which reference should now be made. Advantageous features are set forth in the dependent claims.

Arrangements are described in more detail below and take the form of a computer system for central counterparty limit management, the computer system comprising one or more computers on a network. The computer system comprises an input to receive an indication of a planned order of at least one over-the-counter derivative between counterparties from an asset manager. The planned order is associated with at least one actual order to be executed on an execution venue. The computer system also includes at least one storage device configured to store a limit comprising an indication of counterparty risk as a stored limit of the asset manager; an execution venue output configured to output an indication of a counterparty risk limit of the asset manager to an execution venue; and an asset manager output configured to output an indication that the planned order is within the stored limit of the asset manager to the asset manager. The computer system is configured such that in response to receiving the indication of a planned order at the input from the asset manager, computer system checks if the planned order is within the stored limit of the asset manager, and, if the planned order is within the stored limited of the asset manager, the computer system outputs from the execution venue output an indication of a limit corresponding to the limit required to execute the actual order associated with the planned order on an execution venue to the execution venue. This technical solution solves the technical problem of providing limits to an execution venue just in time for an asset manager to place an order at the execution venue.

In an aspect of the present invention, there is provided a computer system for central counterparty limit management, the computer system comprising one or more computers on a network, the computer system comprising: an input to receive an indication of a planned order of at least one over-the-counter derivative between counterparties from an asset manager; wherein the planned order is associated with at least one actual order to be executed on an execution venue; at least one storage device configured to store a limit as a stored limit of the asset manager; wherein the limit comprises an indication of counterparty risk; and an execution venue output configured to output an indication of a counterparty risk limit of the asset manager to an execution venue; wherein the computer system is configured such that: in response to receiving the indication of a planned order at the input from the asset manager, the computer system checks if the planned order is within the stored limit of the asset manager, and, if the planned order is within the stored limit of the asset manager, the computer system outputs from the execution venue output an indication of a limit corresponding to the limit required to execute the actual order associated with the planned order on an execution venue.

The computer system may further comprise an asset manager output configured to output an indication that the planned order is within the stored limit of the asset manager to the asset manager; and wherein the computer system is configured such that if the planned order is within the stored limit of the asset manager, the computer system outputs from the asset manager output an indication that the planned order is within the stored limit of the asset manager.

The execution venue may comprise a swap execution facility. The computer system may comprise a limit input for inputting a limit for the asset manager from a futures commission merchant. The computer system may be configured to store the limit in the at least one storage device. The limit may be input into the limit input periodically. The limit may be input into the limit input daily. The computer system may be configured to request from the futures commission merchant an increase in the stored limit. The computer system may be configured to request from the futures commission merchant an increase in the stored limit in response to the planned order being outside the stored limit of the asset manager. The indication of counterparty risk may comprise at least one of the following: margin, initial margin, delta, gamma, DV01, BPV, CS01, CS1%, notional amount.

The computer system may be configured to convert a limit of an indication of counterparty risk of one type to another type to output from the execution venue output. The computer system may be configured such that the output from the execution venue output is output immediately. The computer system may be configured such that the output from the execution venue output is output just in time for an asset manager to place an order on the execution venue. The computer system may be configured to convert a limit of an indication of counterparty risk of one type to another type to output from the execution venue output daily. The computer system may be configured to convert a limit of an indication of counterparty risk of one type to another type to output from the execution venue output daily depending on market conditions. The market conditions comprise when at least one market is closed. Advantageously, this prevents delays on the system during conversion. The at least one storage device comprises cache memory. Advantageously, this allows limits stored in the storage device to be transferred quickly to a processor the computer system for quick processing.

The indication of a limit corresponding to the limit required to execute the actual order associated with the planned order on an execution venue may be represented in FIX protocol. Advantageously, this allows limit data to be quickly formatted into a standardized data format.

In a further aspect of the present invention, there is provided a computer system for providing limits to asset managers executing trades at an execution venue, the computer system comprising, on a network, a computerized execution venue, a computerized limits manager, and an asset manager interface; wherein the computerized limits manager is configured to: store limits of an asset manager associated with the asset manager interface as stored limits, wherein each of the limits comprises an indication of counterparty risk; and, to check whether a planned order is within the stored limits; the computerized execution venue is configured to execute actual orders within limits; and the asset manager interface is configured for an asset manager to place actual orders on the execution venue over the network and to send planned orders to the computerized limits store over the network; wherein the computer system is configured such that: in response to the computerized limits manager receiving a planned order from the asset manager interface, the computerized limits checker checking if the planned order is within the asset manager's stored limits, and if the planned order is within the stored limits, an indication of a limit corresponding to the limit required to execute the actual order associated with the planned order is sent from the limits checker to the computerized execution venue.

A permanent communication connection may be provided between at least one of: the computerized limits manager and the execution venue; and the computerized limits manager and the asset manager interface. This allows for fast communication. In another aspect of the present invention, there is provided a computerized method of managing central counterparty limits carried out on one or more computers on a network, the computerized method comprising: an input of the one or more computers receiving an indication of a planned order of at least one over-the-counter derivative between counterparties from at least one asset manager; wherein the planned order is associated with at least one actual order to be executed on a computerized execution venue; in response to receiving the indication of a planned order at the input from one of the at least one asset manager, the one or more computers checking the asset manager's stored limits indicating counterparty risk stored at least one storage device; and if the planned order is within the stored limits, the one or more computers sending an indication of a limit corresponding to the limit required to execute the actual order associated with the planned order to the computerized execution venue.

In a still further aspect of the present invention, there is provided an asset manager computer device for entering orders of at least one over-the-counter derivative on an execution venue for executing over-the-counter derivative orders, the asset manager computer device being configured for a planned order for at least one over-the-counter derivative to be entered and to: send the planned order to a limit checker; receive from the limit checker an indication that a counterparty risk limit has been assigned for the planned order; and enter a real order for at least one over-the-counter derivative on an execution venue for executing over-the-counter derivative orders.

In another aspect of the present invention, there is provided a method of entering orders of at least one over-the-counter derivative on an execution venue for executing over-the-counter derivative orders, the method comprising, on an asset manager computer device: entering a planned order for at least one over-the-counter derivative; sending the planned order to a limit checker; receiving from the limit checker an indication that a counterparty risk limit has been assigned for the planned order; and entering a real order for at least one over-the-counter derivative on an execution venue for executing over-the-counter derivative orders.

In another aspect of the present invention, there is provided a computer system for central counterparty limit management, the computer system comprising one or more computers on a network, the computer system being configured to: receive from an asset manager an indication of a planned order of at least one over-the-counter derivative to execute on an execution venue; in response to receiving the planned order: assess whether the planned order is within a counterparty risk limit assigned to the asset manager by a futures commission merchant; and only if the planned order is within the counterparty risk limit assigned to the asset manager: carve out from the counterparty risk limit assigned to the asset manager a carved out counterparty risk limit corresponding to a counterparty risk limit required to execute an order corresponding to the planned order on the execution venue, and push an indication of the carved out counterparty risk limit to the execution venue.

In another aspect of the present invention, there is provided a computerized method for central counterparty limit management, the computerized method being carried out on one or more computers on a network, the computerized method comprising: receiving from an asset manager an indication of a planned order of at least one over-the-counter derivative to execute on an execution venue; in response to receiving the planned order: assessing whether the planned order is within a counterparty risk limit assigned to the asset manager by a futures commission merchant; and only if the planned order is within the counterparty risk limit assigned to the asset manager: carving out from the counterparty risk limit assigned to the asset manager a carved out counterparty risk limit corresponding to a counterparty risk limit required to execute an order corresponding to the planned order on the execution venue, and pushing an indication of the carved out counterparty risk limit to the execution venue.

A computer-readable medium, such as a CD-ROM, DVD-ROM, hard disk drive or solid-state memory may be provided containing a set of instructions that causes a computer to perform the method.

BRIEF DESCRIPTION OF THE DRAWING

The invention will be described in more detail, by way of example, with reference to the accompanying drawings, in which:

FIGS. 2 to 4 are schematics illustrating a computerized method carried out by the computer system of FIG. 1.

DETAILED DESCRIPTION OF THE INVENTION

Figure 1:
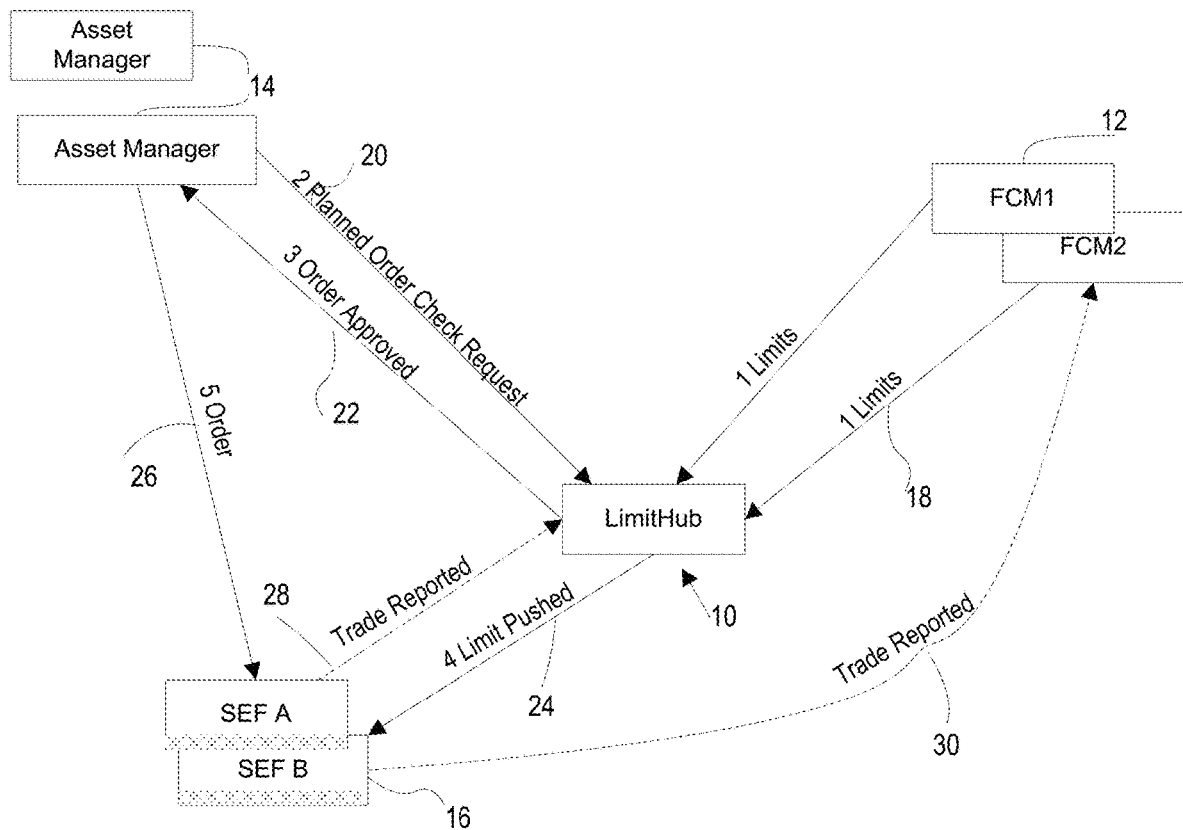
FIG. 1 is a schematic of a computer system embodying an aspect of the present invention.

A computer system and computerized method for central counterparty limit management that manages counterparty risk, particularly for over the counter (OTC) derivatives trades will now be described with reference to FIGS. 1 to 4.

The computer system and computerized method described herein may apply to OTC orders for financial products in the form of derivatives including, but not limited to: interest rate derivatives, such as interest rate swaps (IRS), forward rate agreements (FRA) and overnight indexed swaps (01S); credit default swaps (CDS) including indexed and single names; and foreign exchange (FX) derivatives, such as Non-Delivered Forwards/Non-Delivered Swap Options (Vanilla, Single and Double Barrier, Digital), Non-Delivered Option Spot, Forwards, and FX Swap (for limit calculation).

Referring to FIG. 1, the computer system, computerized limits manager or LimitHub 10 comprises one or more computers on a network implemented as a central Software as a Service (SaaS) arrangement. The or each computer includes at least one processor and memory that interact to control the method described below. The memory includes cache memory. Cache memory is high-speed memory located on or close to the at least one processor. This technical feature is important as it allows the or each computer to quickly calculate and output available limits. LimitHub or computerized limits manager is in communication connection via a computer network with computerized FCMs 12, and computerized execution venues 16, such as SEFs. The communication connections between the LimitHub or computerized limits manager and the FCMs and execution venues are permanently or constantly established. This feature allows quick communication to and from the LimitHub or computerized limits manager. This is because a communication connection, that typically takes a not insignificant time, does not need to be established each time there is communication to or from the LimitHub or computerized limits manager. The FCMs and the execution venues each comprise one or more computers on a network. The or each computer of the FCMs and execution venues include at least one processor and memory that interact. The memory includes cache memory. This cache memory allows the FCMs and execution venues to quickly access relevant data stored on them that has been communicated from the LimitHub. Asset managers 14 use a world wide web or internet graphical user interface, such as a web browser, to access the LimitHub and execution venue computer or computers.

Communication connections are formed between the asset managers and the computerized limits manager. These communication connections are permanently or constantly established. Again, this feature allows quick communication to and from the computerized limits manager. This is because a communication connection, that typically takes a not insignificant time to set-up, does not need to be established each time there is communication to or from the computerized limits manager. Maintaining live on-line connection between the computerized limits manager and the asset manager (as well as with venues) allows for electronic messages to be sent over a live connection avoiding the need to establish a connection and saving the handshake time associated with this set-up.

Electronic messages between the computerized limits manager, asset manager, execution venues and FCMs are in the form of internet protocol (IP) and, in particular, in a basic IP in the form of the FIX protocol. The FIX protocol (Financial Information eXchange) is an electronic communications protocol for international real-time exchange of information. The computer or computers of the FCMs, clearing houses or clearing members (CMs) 12 hold asset managers collateral and grant limits or trading limits to asset managers 14. The asset managers may act for particular funds and clients that include, for example, hedge funds and investment managers. These trading limits are stored in a storage device of the FCM computer or computers, such as a hard disk drive or drives. In the embodiment of FIG. 1, at least some of the trading limits are stored in cache memory. This technical feature allows the computer or computers of the FCM to quickly access data and, therefore, allow fast communication to the computerized limits manager 10.

Trading limits may be set per financial product, currency, or tenor bucket. The trading limits may include, for example, an indication of counterparty risk in the form of a price sensitivity measure such as margin, initial margin (IM) delta, gamma, DV01, BPV, CS01, CS1° A, or notional amount. These are example of types of counterparty risk that are explained below.

Margin is the equity provided by an asset manager as a percentage of the current market value of the securities held in the asset manager's account.

The initial margin is the percentage of the purchase price of securities (that can be purchased on margin) that an investor must pay for with their cash or marginable securities.

Delta is the ratio of the change in price of an underlying asset to the corresponding change in the price of a derivative. Gamma is the rate of change of delta with respect to the price of the underlying asset. It is typically used as a limit for trading foreign exchange (FX) options.

BPV (basis point value) or DV01 (Dollar Value of a 01) are the absolute value of the change in price of a bond for a one basis point change in yield. It is a method of measuring interest-rate risk. It is typically used as a limit for trading interest rate derivatives (IRD).

CS01 or CS1% is a measure of credit spread change. It is typically used as a limit for trading credit default swaps (CDS).

Notional amount (or notional principal amount or notional value) is the nominal or face amount of a financial instrument that is used to calculate payments made on it. It is referred to as notional as this amount does not generally change hands. By way of example, for an IRS, the notional amount is the specified amount on which the exchanged interest payments are based.

Other trading limits or limit types that may be used include: maximum daily aggregated notional amount (typically used for trading IRD and CDS), net operating profit (NOP), daily settlement limit (DSL), maximum order size, maximum tenor, initial margin that is FCM provided, and that is client or asset manager specific, typically using a look-up table per asset, product, currency, underlying and tenor.

For IRD and CDS trading, the limit is applied to trades of the same trade date. In other words, daily limits assuming the utilization is set to zero at each start-of-day. For FX trading, limits are applied on the entire portfolio.

The asset managers 14 may act for particular funds and clients. They each post or place orders including a notional amount to execution venues 16. In OTC markets in which the asset managers act, they act as market makers by quoting prices at which they will sell (ask or offer) or buy (bid) to other asset managers. This may be carried out by human traders or dealers of the asset managers entering quotes on computer terminals or devices of the asset manager computer network (for example, using an interface such as a web browser) or by computers operating under predefined algorithms (so called algo-traders) to enter or place orders. An asset manager is typically associated with several or a plurality of execution accounts each at a different execution venue. Execution venues facilitate trading by managing a central limit order book (CLOB) of orders or quotes entered by asset managers. The execution venues execute or match orders or contra-side orders entered by the asset managers. However, orders entered into the execution venue become cleared trades only if matched with contra-side orders and both sides are within their trading limits as stored at the computerized limits manager computer system 10. The execution venues present to asset managers the current best bid/ask orders. Execution venues may also facilitate request for quote (RFQ) trading. Generally, on a periodic basis (for example, daily) the FCMs 12 establish and publish or send to computerized limits manager 10 risk-based limits on an asset manager's 14 account via a communication connection 18. Just before an asset manager plans to act in the market, the asset manager checks computerized limits manager, via a communication connection 20, if sufficient limits are available for the asset manager to place an order at a specified execution venue 16.

Computerized limits manager 10 checks or assesses as a Planned Order Check Request if there are sufficient limits for the given asset manager's planned order. Examples of this are illustrated in FIGS. 2, 3 and 4.

Different aggregation of limit reservations is made depending on the type of limit. For gross limits (for example, notional or notional amount, gross DV01, or gross IM) all limit reservations for pending orders are aggregated together into a pending pool. For net limits (for example, DV01, IM)

pending reservations of risk increasing and risk reducing are aggregated separately into two pools. These pools are separate.

Limit check operation for net limit types is illustrated in FIG. 2 (risk increasing/long order) 100 and FIG. 3 (risk decreasing/short order) 102. When checking credit of a new order, the computerized limits manager 10 considers the net limit types set out below. The computerized limits manager considers opening (or current) utilization value 104. An FCM can set the limit and the current utilization value, thus reflecting to an account owner the portfolio limit and utilization. Alternatively, an FCM can set daily limit with zero opening utilization. The computerized limits manager considers previously approved or pending orders 106,107 across all ping venues or execution venues 16, which are at the same direction of the new order being evaluated 110,111. In case of a gross limit, direction is ignored. The computerized limits manager considers any trades executed since the last utilization update was made by the FCM 108. Utilization of trades is considered proportional to a so-called ping pool—the non-carved-out percentage. The computerized limits manager assumes full use of limits carved out to push venues or execution venues.

Thus, referring to FIG. 2, to check whether there is sufficient long limit available, the computerized limits manager 10 adds together the opening utilization 104, the pending long utilization 106, the traded utilization 108 and the new long order utilization 110 and if this is within the total long limit 114 then there are sufficient long limits and an appropriate message in FIX format is communicated from the computerized limits manager to the relevant execution venue 16.

For a short limit, referring to FIG. 3, to check whether there is sufficient short limit available, the computerized limits manager 10 adds together the opening utilization 104, the pending short utilization 107 (effectively negative), the traded utilization 108 and the new short order utilization 111 (effectively negative) and if this is within the total short limit 116 then there are sufficient short limits and an appropriate message in FIX format is communicated from the LimitHub to the relevant execution venue 16.

As illustrated in FIG. 4, for gross limit types, when checking credit of a new order the computerized limits manager 10 considers the following. The computerized limits manager considers opening (or current) utilization value 200. An FCM 12 can set the limit and the current utilization value, thus reflecting to account owner the portfolio limit and utilization. Alternatively, the FCM can set daily limit with zero opening utilization. The computerized limits manager considers previously approved orders 202 across all ping venues or execution venues 16. The computerized limits manager considers any trades executed, traded, or committed 204 since the last utilization update was made by the FCM. Utilization of trades is considered proportional to the so-called ping pool— the non-carved-out percentage. The computerized limits manager 10 assumes full use of limits 206 carved out to push venues or execution venues 16.

Thus, referring to FIG. 4, for the case of approving an order under the gross limit type, to check whether there is sufficient limit available, the following steps are carried out. The computerized limits manager 10 adds together the opening utilization 200, the pending utilization 202, the traded utilization 204, the limits already carved out to push or executions venues 206 and the new order utilization 208 and if this is within the total limit 210 then there are sufficient limits and an appropriate message in FIX format is communicated from the computerized limits manager to the relevant execution venue 16.

The computerized limits manager has a risk analytics module or computer that uses up-to-date market data for computing the risk measures resulting from orders and done trades.

The risk measures are compared to set limits. If sufficient limits are found, limit is reserved at computerized limits manager 10, order approval is replied to or sent to the asset manager 14 via communication connection 22. The limit is reserved for a particular predetermined time, such as for a trading day or the remainder of the trading day.

At the same or similar time, order approval is replied to or sent to the asset manager 14, limits are pushed to the execution venue 16, via communication connection 24 between computerized limits manager 10 and execution venue, which was indicated in the Planned Order Check Request.

The asset manager 14 then places an order at the execution venue 16 via communication connection 26 between Asset Manager and the execution venue using, for example, a web browser or other interface. The execution venue 16 accepts the order as sufficient limits were pushed or sent to the execution venue and are now available as included in the indication received at the execution venue from computerized limits manager 10 at the asset manager's execution venue trading account.

If a contra-side or counter order is found, the asset manager's order is matched with it at the execution venue 16 so that the desired trade occurs. The trade is reported via a communication connection 28 to computerized limits manager 10, via communication connection 30 to the asset manager's FCM 12 and its central counterparty for clearing. The computerized limits manager updates the available limit for the asset manager considering the done trade.

If the planned order is cancelled, an appropriate indication being transmitted to the asset manager 14, to computerized limits manager 10 and finally to the FCM 12. Then zero limits are pushed to the execution venue 16, via communication connection 24 between computerized limits manager 10 and execution venue. In this way, unused reserved limits are released.

Once quotes have been matched or executed on the execution venue, the asset managers allocate the resulting trades to particular funds' clearing accounts that they handle. By having the computerized limits manager or computer system 10 act as central limit pool manager that pushes limits to execution venues 16 immediately or just in time for an asset manager 14 to trade on an execution venue, fragmentation of limits to execution venues is avoided, providing flexibility to the asset manager. The asset manager does not need to plan in advance any carving out of limits to execution venues. Instead, the asset manager can look for best execution and just prior to placing an order at an execution venue, the computerized limits manager pushes sufficient limits to the execution venue. The computerized limits manager pushes limits to execution venues by storing relevant limit data in the cache memory, using the FIX protocol for electronic message transmission to the execution venue, and via the permanent communication connections to and from the computerized limits manager. These technical features allow the LimitHub to process data quickly, quickly form the limit data into a standardized data format, and output the limit data that can be quickly interpreted by execution venues. Typically, the computerized limits manager can push limits to the execution venue in about 100 milliseconds (ms). In this way, a credit line or limits can be communicated to the execution venue fast enough before the market moves and so that an order can be executed at an execution venue at the desired price.

If the FCM 12 indicates that there is an insufficient limit for a particular proposed or planned order, the computerized limits manager 10 may send a request to the FCM to increase the limit available; this request may be initiated by the asset manager 14 via the computerized limits manager 10. The result of this request is sent from the FCM to the computerized limits manager. If the limit is increased, the limit is accepted and the computerized limits manager acts as described above.

The actual order placed may not be the same as the asset manager's 14 planned order, for example, the amount may be less. A series of actual orders that are each for a smaller amount than the asset manager's planned order but together add up to the same or less than the amount of the planned order may be placed over a period of time for which the limit is reserved, such as over the trading day. The number of actual orders using the reserved or allocated limit may be limited to a particular number of trades, for example, 100 or less trades or 10 or less trades. Also, an actual order associated with a planned order may not be placed immediately that a limit has been allocated for the planned order. In this way, advantageously, a large total order may be masked to prevent movement in the market, in the manner of an iceberg order.

The types of limits that are acceptable by an execution venue 16 may be different from those defined by the FCM 12. In which case, after the computerized limits manager or computer system 10 receives the FCM's limits it converts them to a limit acceptable to the execution venue before placing or pushing the appropriate portion of the limits to the execution venue. This is carried out by a converter of the computerized limits manager or computer system. For example, if the FCM sets a limit of an initial margin limit of US$100, after approving an order which consumed US$50 of the initial margin limit the computerized limits manager passes US$150 of limit in the form of DV01 to the execution venue. This is because the US$150 of DV01 limit is equivalent for that order of US$50 of initial margin limit. In this example, the conversion is carried out daily, depending on market conditions when at least one market is closed, such as one of the major markets of London, New York, or Tokyo. In this way, trading is less affected, and delays are low during the conversion.

The conversion is carried out based on the last conversion ratio at the end of the trading day for use during the next trading day. Calculating in advance conversion coefficients between limit types, saves compute time when limits needs to be pushed to a venue. The arrangement described above, provides for a quick response time to allow an asset manager to place an order at a venue before the financial markets move and the requested price changes.

In summary, the computer system or computerized limits manager 10 for central counterparty clearing includes a single computer or a plurality of computers on a network. It has an input or network connection to receive indications of planned orders from at least one asset manager 14 for an OTC derivative between counterparties. Each planned order has associated risk and is associated with at least one actual order to be executed on an execution venue. The computerized limits manager 10 includes at least one storage device, such as a hard disk drive and in particular cache, configured to store limits or risk limits of the or each asset manager. Each of the limits is an indication of counterparty risk.

Computerized limits manager 10 also has an output or network connection or connections to output an indication to the or each asset manager that the planned order is within risk limits so that at an actual order associated with the planned order may be executed at the execution venue. The computer system or computerized limits manager responds to receiving the indication of a planned order at the input from one of the at least one asset manager, if the planned order is within the asset manager's stored limits, an indication that the planned order is within the asset manager's stored limits is output from the output of the computerized limits manager. The indication is output and transmitted to the asset manager 14 that the planned order is within risk limits. An indication of a pushed risk limit is also output to the execution venue or SEF 16 to allow future execution of the planned order once placed by an asset manager 14 at the execution venue.

Embodiments of the present invention have been described. It will be appreciated that variations and modifications may be made to the described embodiments within the scope of the present invention.

The invention claimed is:

1. A hub computer device comprising:
  computer executable program code stored in a memory and executable by a processor of the hub computer device coupled with the memory to cause the hub computer device to:
    receive, from one of a plurality of asset manager computer devices via a computer network coupled therebetween, information related to a planned order, the information including the identity of at least one over-the-counter derivative to be traded with one or more counterparties and an indication of one of a plurality of execution venues, coupled with the hub computer device via the computer network, to which the planned order is to be transmitted by the asset manager computer device via the computer network;
    receive, via the computer network from one or more credit computer devices prior or subsequent to receipt of the information, and store in the memory for each of the plurality of asset manager computer devices, data indicative of total available counterparty risk for the associated asset manager computer device;
    assign a counterparty risk limit to the planned order;
    account for the assigned counterparty risk limit against the total available counterparty risk stored in the memory;
    transmit, via the computer network, the assigned counterparty risk limit to the indicated execution venue and, subsequent thereto, transmit, via the computer network, to the asset manager computer device from which the information was received, an indication that the counterparty risk limit has been assigned for the planned order and sent by the hub computer device to the indicated execution venue via the computer network; and
  wherein a real order for the at least one over-the-counter derivative transmitted by the asset manager computer device to the indicated execution venue is received thereby after the indicated execution venue receives the counter party risk limit from the hub computer device.

2. The hub computer device of claim 1, wherein connections via the computer network between the hub computer device and the plurality of asset manager computer devices, the one or more credit computer devices and the plurality of execution venues are pre-established.

3. The hub computer device of claim 1, wherein the received data indicative of the total available counterparty risk for each asset manager computer device is stored in a cache memory coupled with the processor.

4. The hub computer device of claim 1, wherein the received data indicative of total available counterparty risk for an associated asset manager computer device is a current total available counterparty risk updated, by the credit computer device from which it was received, based on one or more execution reports received by the credit computer device from one or more of the execution venues which indicate an execution status of one or more real orders received thereby.

5. The hub computer device of claim 1, wherein the computer executable program code is further executable by the processor to cause the hub computer device to determine, prior to the assignment of the counterparty risk limit to the planned order, that sufficient available counterparty risk is available to account for the planned order.

6. The hub computer device of claim 1, wherein the intended execution venue comprises a swap execution facility.

7. The hub computer device of claim 1, wherein each of the one or more credit computer devices is operated by a futures commission merchant.

8. The hub computer device of claim 1, wherein the total available counterparty risk for an associated asset manager computer device is periodically updated.

9. The hub computer device of claim 8, wherein the total available counterparty risk for an associated asset manager computer device is updated daily.

10. The hub computer device of claim 1, wherein the computer executable program code is further executable by the processor to cause the hub computer device to transmit, via the computer network, information to the one or more credit computer devices concerning total counterparty risk limits of one or more of the plurality of asset manager computer devices.

11. The hub computer device of claim 1, wherein the asset manager computer device is associated with a plurality of execution accounts each at a different execution venue.

12. A computer implemented method comprising:
receiving, from one of a plurality of asset manager computer devices via a computer network coupled therebetween, information related to a planned order, the information including the identity of at least one over-the-counter derivative to be traded with one or more counterparties and an indication of one of a plurality of execution venues to which the planned order is to be transmitted by the asset manager computer device via the computer network;
receiving, via the computer network from one or more credit computer devices prior or subsequent to receipt of the information, and storing in the memory for each of the plurality of asset manager computer devices, data indicative of total available counterparty risk for the associated asset manager computer device;
assigning a counterparty risk limit to the planned order;
accounting for the assigned counterparty risk limit against the total available counterparty risk stored in the memory;
transmitting, via the computer network, the assigned counterparty risk limit to the indicated execution venue and, subsequent thereto, transmitting, via the computer network, to the asset manager computer device from which the information was received, an indication that the counterparty risk limit has been assigned for the planned order and sent to the indicated execution venue via the computer network; and
wherein a real order for the at least one over-the-counter derivative transmitted by the asset manager computer device to the indicated execution venue is received thereby after the indicated execution venue receives the counter party risk limit.

13. The computer implemented method of claim 12, wherein connections via the computer network with the plurality of asset manager computer devices, the one or more credit computer devices and the plurality of execution venues are pre-established.

14. The computer implemented method of claim 12, wherein the received data indicative of the total available counterparty risk for each asset manager computer device is stored in a cache memory coupled with the processor.

15. The computer implemented method of claim 12, wherein the received data indicative of total available counterparty risk for an associated asset manager computer device is a current total available counterparty risk updated, by the credit computer device from which it was received, based on one or more execution reports received by the credit computer device from one or more of the execution venues which indicate an execution status of one or more real orders received thereby.

16. The computer implemented method of claim 12, further comprising determining, prior to the assignment of the counterparty risk limit to the planned order, that sufficient available counterparty risk is available to account for the planned order.

17. The computer implemented method of claim 12, wherein the intended execution venue comprises a swap execution facility.

18. The computer implemented method of claim 12, wherein each of the one or more credit computer devices is operated by a futures commission merchant.

19. The computer implemented method of claim 12, wherein the total available counterparty risk for an associated asset manager computer device is periodically updated.

20. The computer implemented method of claim 19, wherein the total available counterparty risk for an associated asset manager computer device is updated daily.

21. The computer implemented method of claim 12, further comprising transmitting, via the computer network, information to the one or more credit computer devices concerning total counterparty risk limits of one or more of the plurality of asset manager computer devices.

22. The computer implemented method of claim 12, wherein the asset manager computer device is associated with a plurality of execution accounts each at a different execution venue.

23. A computer system comprising:
a hub computer device coupled between a plurality of asset manager computer devices, a plurality of execution venues and one or more credit computer devices via a computer network, the hub computer device configured to:
receive, from one of the plurality of asset manager computer devices, information related to a planned order, the information including the identity of at least one over-the-counter derivative to be traded with one or more counterparties and an indication of one of the plurality of execution venues to which the planned order is to be transmitted by the asset manager computer device;

receive, from the one or more credit computer devices prior or subsequent to receipt of the information, and store in a memory of the hub computer device for each of the plurality of asset manager computer devices, data indicative of total available counterparty risk for the associated asset manager computer device;

assign a counterparty risk limit to the planned order, and account therefore against the total available counterparty risk stored in the memory;

transmit the assigned counterparty risk limit to the indicated execution venue and, subsequent thereto, transmit, to the asset manager computer device from which the information was received, an indication that the counterparty risk limit has been assigned for the planned order and sent by the hub computer device to the indicated execution venue; and wherein a real order for the at least one over-the-counter derivative transmitted by the asset manager computer device to the indicated execution venue is received thereby after the indicated execution venue receives the counter party risk limit from the hub computer device.

* * * * *